United States Patent Office 2,861,424
Patented Nov. 25, 1958

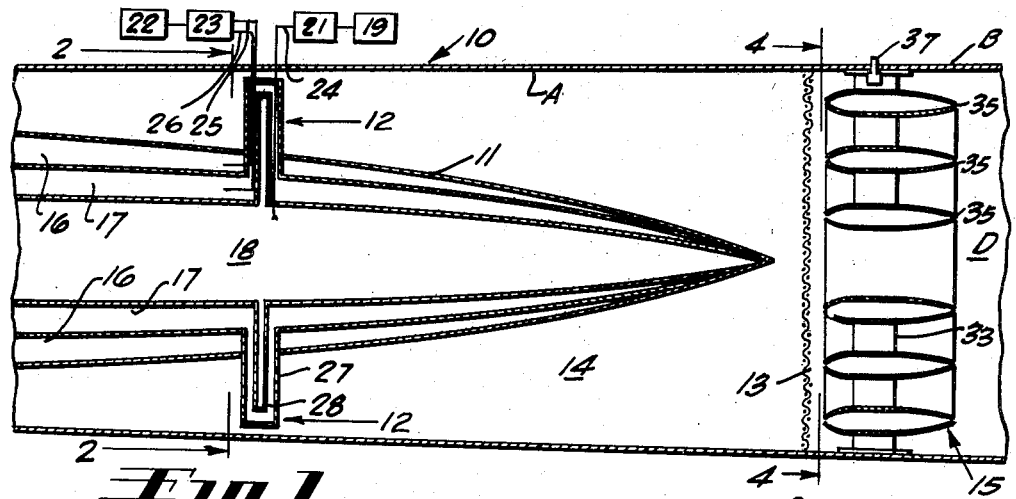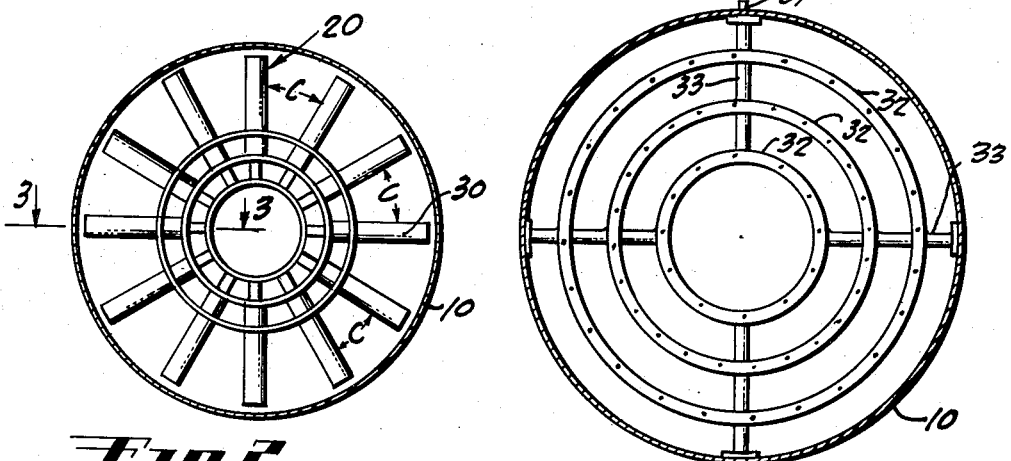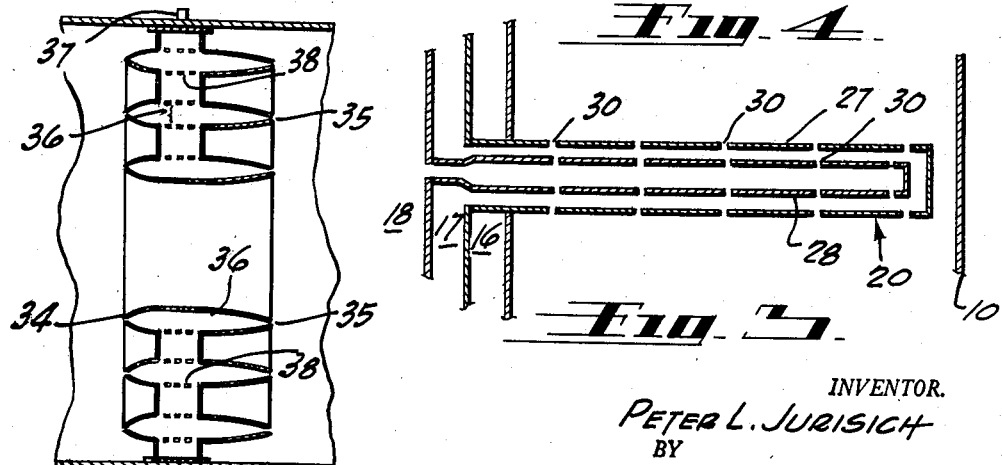

2,861,424

FUEL SUPPLY MEANS FOR COMBUSTION APPARATUS

Peter L. Jurisich, Torrance, Calif., assignor to Douglas Aircraft Company, Inc., Santa Monica, Calif.

Application April 9, 1954, Serial No. 422,126

2 Claims. (Cl. 60—39.72)

This invention relates to combustion apparatus, that is, to devices for effecting burning of a combustible fluid or fluid-mixture.

Although it is primarily concerned with effecting combustion in power plants, such as turbo, or ram, jet engines, it can equally well be employed in heating plants, chemical plants, etc., as will be made manifest hereinafter.

Applied to power plants, whether stationary or vehicular, the present combustion apparatus may be employed in both the primary and the secondary combustion chambers of jet engines, although presently contemplated primarily for utilization in the secondary combustion chamber of these engines as an after burner unit.

In any of its fields of utility, however, the invention provides combustion apparatus which, by the elimination of detonation and buzz-burning, starts as nearly infallibly as is possible for combustion devices and thereafter operates or burns steadily and stably, that is, without resonation or fluctuation. Notwithstanding these advances, the power required to supply and operate the device has been found to be less than that for conventional such apparatus of the same capacity.

In reaching these objectives, the invention provides secondary combustible-supplying means and a burner group which, individually and in mutual association, renders flow disturbance truly negligible. The combustible supply means includes an injector of fuel and air, located at the upstream zone of the engine casing, which is so profiled and arranged as to have such low drag as to produce negligible wakes. In the injector itself, with normal fuel viscosity, consistency and composition, there is such a slight possibility of clogging occurring as to be ignorable. The injector is arranged transversely of the engine casing and discharges secantwise into same a multiplicity of fine fuel-air streams that mutually cross and together completely fill the cross-section of the casing at their place of entry with a continuous, uniform sheet of combustible fluid. Initial proper distribution of the combustible on which effective subsequent ignition thereof is predicated, is thus assured.

The burner and flame-holder itself is of novel configuration and enhanced efficiency. By means of a plurality of hollow elongate annular small combustion chambers mounted concentrically in the casing downstream considerably of the aforesaid combustible "distribution-sheet," or plane, with the front and rear ends of each such chamber open and with each chamber streamlined from upstream to downstream, a small portion, say 2%, of the main fuel-air stream leaving the fuel injection sheet is itself divided into a plurality of igniter-bodies. These bodies are ignited in these small chambers by a single-shot ignition device or spark plug and emerge from the burner unit as a plurality of concentric, flaming rings which in turn ignite the major portion of the combustible fluid flowing downstream outside of and surrounding each of these igniter-rings.

In order to eliminate turbulence where the flaming rings join the main stream, thereby to obviate buzz-burning and resonance, the inlets of the chambers are larger than the outlets by a critical amount, say 3½% to 5%, thereby to render the flame and main stream velocities practically equal where the gases meet, thus to obviate turbulence and consequent resonation.

For the purpose of assuring the most efficient and complete combustion in these chambers that is feasible, they are given an expanded profile such that the entering 2% of the main stream expands and decelerates in a certain portion of each chamber. The decelerated gas or vapor is ignited in a very complete manner.

By virtue of this same construction, the chambers are given a downstream streamlined profile which assists in minimizing the wakes, if any, downstream of the burner, thereby contributing to the elimination of resonance and buzz-burning.

A special reticulate diaphragm is contemplated for viscosity damping the amplitude of any pulsating flow which may occur in the main stream between the injector-group and the burner group. This diaphragm is disposed just upstream of the burner and may, in one form, consist of a very fine mesh thin-wire screen. By throwing the vibrations or pulsations of the fluid stream thereat out of phase with those upstream, resonance is prevented. This diaphragm takes advantage of the viscosity of the fuel-air mixture in performing its phase-shifting function.

Between the diaphragm and the injector the casing is shaped and arranged to induce the fuel and air to mutually diffuse and intermingle into an efficient and readily ignitable mixture.

The inventive concepts include secondary features of novelty and enhancement which will either be set forth hereinafter or become self-evident.

In order to further clarify the present concepts and to enable them to be designed into a physical embodiment, one of the presently-preferred specimens is represented in the accompanying drawings and described, part-by-part, hereinafter in conjunction with said drawings.

In these drawings,

Figure 1 is a fragmentary, longitudinal section of the aft portion of a jet engine incorporating subject invention and showing the extraneous system for supplying the fuel and air to the engine;

Figure 2 is a fragmentary section on line 2—2 of Figure 1, showing the system for introducing the fuel-air mixture into the engine in a novel manner;

Figure 3 is a detailed, longitudinal section of one of the injector nozzles in the combustible-introducing system and taken on line 3—3 of Figure 2;

Figure 4 is an end view of the upstream end of the triple-function igniter, burner and flameholder, and Figure 5 is a fragmentary longitudinal section of this triple-function means, showing same partly in section and partly in side elevation.

The present combustion apparatus is shown in the drawings as an afterburner, or secondary combustion, jet thrust augmenting means, in the aft portion of the casing 10 of a turbo-compressor jet engine. The primary combustion means are not shown but lie to the leftward in Figure 1.

The casing 10, as shown, comprises a frusto-conical forward portion A and a right-cylindrical portion B.

Coaxially of portion A, and preferably extending along the longitudinal center line thereof is a hollow frusto-conical or streamlined supporting member 11 having its apex pointing rearwardly.

Mounted to the member 11 is a nozzle-rake unit 12, later described. A viscous-damping means 13 cooperates with the "swept" area of the nozzle rake unit to define a diffusion chamber 14. Aft of member 13 is a flame-type igniter 15 for the major portion of the secondary fuel-air mixture, that is, the portion thereof not employed in the igniter as the fuel therefor. Rearwardly of igniter 15 is an afterburning chamber D where both the incompletely burned products of combustion emanating from the primary combustion chamber, not shown, and the secondary fuel are completely burned.

Referring now to the construction of the fuel-air introducing means and particularly to Figures 1 and 2, the hollow frusto-cone 11 includes, first, an outer annular space 16 which is filled with air supplied from an extraneous source, later described, and is adapted to insulatingly blanket the inner portions, particularly the fuel conducting portion, of the cone from the highly heated combustion-products emanating from the primary combustion portion of the engine.

This conical supporting member next inwardly includes an annular air-manifold 17 for cooperation with the nozzle-rake, manifold 17 being supplied with atomizing, or high-pressure, air from the aforementioned extraneous source.

Centrally and longitudinally disposed in the streamlined support 11 is a fuel manifold 18 connected to the nozzles and to an external pressure-fuel supply.

The fuel and air supply system, as shown diagrammatically in Figure 1, comprises a fuel pump 19 series connected to a fuel control unit 21, preferably located in or controllable from the pilot's cockpit; an air supply-compressor 22 forming part of the propulsion plant; and an air regulator 23 also in or controllable from the cockpit. A fuel-supply conduit 24 leads from the fuel pump and fuel control device to the fuel manifold 18.

One air supply conduit 25 leads from the air compressor and control to the air manifold 17 in the supporting member. A branch air conduit 26 leads from the air control device 23 to the insulating blanket 16.

The nozzle rake comprises a plurality of radially extending and outwardly diverging nozzles 20 mounted at circumferentially spaced loci on the support 11. Each nozzle includes a pair of hollow coaxial cylinders, the inner one, 28, of which terminates at its inner end in axial communication with the central fuel manifold 18. The outer hollow cylinder 27 terminates inwardly in axial communication with the air manifold 17 and is streamlined in parallelism with the streamflow in the casing portion A.

Both the cylinders, 27 and 28, are perforate in loci 30 spaced longitudinally therealong, the perforations, if desired, but not necessarily, mutually registering and being directed at right angles to the direction of flow of the combustion-products from the primary combustion chamber and they extend in the cross-sectional plane of the shell 10.

Thus, each nozzle discharges a plurality of "atomized" fuel-air streams secantwise of the cross-section of the shell, instead of parallel to the longitudinal axis of the shell. These secant-streams from each nozzle cross similar streams from the adjacent nozzles, all lying in the cross-section of the shell plane thereat. Thereby, substantially complete filling of the shell along all local diameters thereof is positively effected, so that complete distribution of the combustible and good mixing thereof with the primary combustion-products, are assured. The tubes 27 and 28 are relatively large in diameter, as are the perforations 30 therein. Since the fuel-air mixture is force-fed, instead of gravitationally supplied and because the emerging jets thereof do not "buck" the main stream in the shell and encounter no opposition, no "clogging" or turbulence occurs. This function is facilitated by the fact that each fuel tube 28 is centrally disposed and is blanketed in the nozzle by an insulating layer composed of the pressure air in tube 27. By virtue of the lack of clogging and the atomized discharge radially away from the main stream path in the shell, an appreciable lowering in the power necessary to operate a nozzle rake of a given capacity over a conventional injector system is effected. Due to the radially diverging nozzles and to their critical streamlining, the drag of the rake is substantially negligible, as is the turbulence or wake created thereby. Resonance or pulsation due to the injection of combustible is thereby minimized.

The sectorial spaces between the outwardly diverging nozzles define the inlets C of diffusion chamber 14, the outlet face of which is defined by the viscous-damping means 13. Chamber 14, being frusto-conical with its base rearward, enlarges radially from front to rear so that the fuel and air are provided with increasing radial space, as well as with longitudinal space, in which to intermingle or diffuse without turbulence so as to become completely combustible by the time it reaches the igniter and flameholder, with no occlusions of unburned fuel.

Referring now to the construction of the novel viscous-damping means shown diagrammatically in Figure 1, these means are provided for the purpose of constraining to a low value the resonant-amplitudes of the pulsating flow of the stream (products of the primary combustion chamber and the injected, mixed fuel-and-air) striking same. Thereby, "buzz," or resonant burning is minimized and the burning and other operation of the apparatus is completely stabilized.

In its present, exemplificatory embodiment these damping means consist of a reticulate diaphragm in which the meshes are very fine and are defined by wires of extreme thinness. As another consequence, the diaphragm also damps unavoidable flow-disturbances originating upstream, say in the primary combustion chamber.

Referring now to the novel main stream igniter, burner and flameholder 15 shown in detail in Figures 4 and 5, this element consists essentially of means for radially dividing a minor portion, say 2%, of the flowing body of mixed and viscously damped fuel-and-air passing through damper 13 into a plurality of concentric annular combustible bodies; confining these bodies and decelerating them sufficiently to assure complete combustion thereof without detonation and buzz-burning; igniting all the bodies by a "single-shot" type of igniter and establishing and holding flame fronts on the downstream ends of the annular bodies for the purpose of enabling them to serve continuously thereafter as the igniters for the subsequent main streams of combustible coming thru the damper thereby to make these serve as thrust augmenters. This afterburner also is effective for completing the burning of the unburned products of combustion emanating from the primary combustion chamber, not shown.

To these and other ends, the element 15 of the afterburner configuration comprises a plurality of concentric hollow annular bodies 32 which are elongated, and otherwise specially shaped in the longitudinal direction or in profile and are supported in radial separation and mounted coaxially of the casing by means of short, hollow struts 33. Struts 33 preferably lie along two diametral lines that extend at right angles to each other and are streamlined in the direction of flow of the main stream. They are joined to the hollow annular bodies at openings 38 in the top and bottom of the bodies in the region of maximum cross-sectional area of the bodies.

Each of the hollow rings 32 constitutes an individual combustion chamber and to this end, each member 32 is open at its front, annular end to constitute an inlet 34 for the predetermined 2%, or other minor portion, of the fuel-air mixture passing thru damper 13. The chambers 32 being streamlined rearwardly, the rear ends thereof are narrower than the front ends and these narrow annular rear ends are also open so as to constitute outlets 35 for flaming gases.

The area of the openings 34 in the front ends of the chambers 32 is predeterminedly not over 7½% of the maximum cross-sectional area of the annular body. This maximum area occupies about one-third of the total foreand-aft length of the body, and begins at a point lying about one-tenth of the body-length back of the rounded nose of the body, terminating about three-tenths of a body-length rearwardly of this nose. This maximum area portion, being contacted top and bottom by the struts 33, can be flat, if desired. Rearwardly of this area, the annular bodies taper rearwardly in streamlined fashion to the outlet 35, which is only about 3% (range 2%–4%) of the maximum cross-sectional area of the annular body.

The minor, 2%, portion of the "secondary" fuel-air mixture that flows into the annular bodies is decelerated to such a low velocity in the maximum area portion 36 that, upon suitable ignition thereof, substantially complete combustion occurs in each ring. In order to initiate ignition, followed by self-piloting ignition in all the rings, a single-shot ignition device 37 is mounted in the outer end of an outer-most strut 33 and sets in train a series of annular flames in all the rings, which flow-communicate, as thru openings 38 in the flat faces of the rings.

The flaming gases flow rearwardly out of the narrow, 3% area outlets 35 and by virtue of the combination of the relatively wider inlets and deceleration zones, these flaming gases are given a velocity nearly equal to that of the main, or 98%, fuel-air mixture flowing past the rings on their outsides. As a consequence, where the flaming burner-gases meet and ignite the main stream there is little, if any, turbulence or flow disturbance. Hence, not only are the burner flames stable but create a stable, buzzless flame front thereat with the main stream.

Because of the streamlined cross-sectional shape, the nose of each annular body builds up a positive "aerodynamic" pressure area in the main fluid stream and, in combination with the wide maximum area portion 36 together with the wide inlet and narrow outlet, creates a large pressure differential in each body thus enabling a relatively low main-stream velocity to force the 2% portion of the stream properly thru the rings, thereby conserving power.

As far as practicable, therefore, the present secondary combustion apparatus, by means of the novel rake and burner and the aforestated configurations thereof with each other and with the other components, materially reduces drag and turbulence, for one reason by minimizing wake-sizes all thru the apparatus.

Further to these ends, the fuel-introducing means, as aforedescribed, eliminates clogging with all normal fuels. These means also with a given power-application, effect unexpectedly good atomization. Because of the novel construction of the rake-supporting means and the construction and arrangement of the nozzles therewith, injecting the fuel-air secantwise in a multiplicity of streams filling the cross-section of the casing, the combustible is, right from the start, distributed widely instead of, as is often the case being concentrated near the center or the periphery of the casing.

The true, self-piloting igniter 15, after initial ignition by the spark plug, functions automatically on 2% of the main stream to continuously and detonationlessly ignite the other 98% thereof. Because of the novel aerodynamic characteristics of the profile of each ring and the location of the deceleration chamber therein, as well as the proportioning of the inlet and outlet areas, a reduction in the operating power necessary is effected. By the same token, the wake of each ring is rendered substantially negligible. The temperature gradient never reaches extremes.

Although for purposes of clarification and exemplification certain specific proportions, shapes and locations have been set forth in describing one of the presently-preferred embodiments, as a matter of fact and of law such specificity by no means limits the invention to such design. For, the actual scope of the inventive improvements is defined and circumscribed only by the ambit of the sub-joined claims which express the novelties of the invention in terms of means for accomplishing the advances achieved thereby.

I claim:

1. In a combustion apparatus that includes an elongate casing open at each of its ends: means for introducing a combustible fuel-and-air mixture into said casing for enabling combustion therein and comprising hollow supporting means extending longitudinally in said casing downstream of the one end of said casing, said hollow supporting means being radially divided into a plurality of coaxial, annular chambers; a first one of said chambers being connected to a source of air under pressure so as to effectuate pressurized airflow therethrough; means for introducing fuel under pressure into a second one of said chambers; hollow coaxial members mounted on said supporting means so as to extend radially of the casing from said supporting means, each of said hollow members being perforate on the faces thereof that face transversely to the major axis of the casing; means connecting a first one of said coaxial hollow members to the aforesaid first chamber containing pressurized air; and means connecting a second one of said hollow members to the aforesaid second chamber containing fuel, whereby to effect atomized, unclogged injection into said casing of a plurality of secantwise extending combustible fluid mixtures with the minimum expenditure of power.

2. In a combustion apparatus including an open-ended casing, means for safely introducing a combustible fuel-air mixture into said casing and comprising: hollow, elongate supporting means extending longitudinally centrally of said casing proximal to the downstream portion of said casing, said supporting means being radially divided into three coaxial substantially concentric annular chambers, the outermost chamber confining an insulating blanket of dead air, the intermediate chamber being connected to a source of pressurized air, and the innermost chamber being connected to a source of pressurized fuel; hollow coaxial members extending radially outwardly from said supporting means as concentric pairs, each of said coaxial members being perforate on the faces thereof that face transversely to the major axis of the casing; means connecting a first one of said hollow members to the aforesaid intermediate chamber; and means connecting a second one of said hollow members to the aforesaid innermost chamber.

References Cited in the file of this patent

UNITED STATES PATENTS

| | | | |
|---|---|---|---|
| 2,535,410 | Grevas | Dec. 26, | 1950 |
| 2,551,112 | Goddard | May 1, | 1951 |
| 2,632,300 | Brzozowski | Mar. 24, | 1953 |
| 2,646,664 | Meschino | July 28, | 1953 |
| 2,693,083 | Abbott | Nov. 2, | 1954 |
| 2,720,078 | Day et al. | Oct. 11, | 1955 |

FOREIGN PATENTS

| | | | |
|---|---|---|---|
| 588,847 | Great Britain | June 4, | 1947 |
| 981,045 | France | Jan. 10, | 1951 |